United States Patent
Koch et al.

(10) Patent No.: US 8,991,481 B2
(45) Date of Patent: Mar. 31, 2015

(54) HEAT EXCHANGER FOR A MOTOR VEHICLE, AND METHOD FOR MANUFACTURING A COOLING TUBE OF A HEAT EXCHANGER

(75) Inventors: Hans Koch, Ditzingen (DE); Matthias Pfitzer, Deizisau (DE)

(73) Assignee: Behr GmbH & Co. KG, Stuttgart (DE)

( * ) Notice: Subject to any disclaimer, the term of this patent is extended or adjusted under 35 U.S.C. 154(b) by 527 days.

(21) Appl. No.: 12/986,980

(22) Filed: Jan. 7, 2011

(65) Prior Publication Data

US 2011/0162825 A1    Jul. 7, 2011

Related U.S. Application Data

(63) Continuation of application No. PCT/EP2009/004884, filed on Jul. 7, 2009.

(30) Foreign Application Priority Data

Jul. 7, 2008    (DE) .......................... 10 2008 031 614

(51) Int. Cl.
*F28F 1/00* (2006.01)
*F28F 1/02* (2006.01)
(Continued)

(52) U.S. Cl.
CPC ................. *F28F 1/022* (2013.01); *B21C 37/14* (2013.01); *B23K 1/0012* (2013.01); *F28D 1/0391* (2013.01); *F28F 21/089* (2013.01); *B23K 2201/14* (2013.01)
USPC ....................................... 165/177; 165/134.1

(58) Field of Classification Search
CPC ...... F28F 21/089; F28F 19/06; F28D 1/0391; B23K 2201/14
USPC .................... 165/133, 134.1, 177; 29/890.053
See application file for complete search history.

(56) References Cited

U.S. PATENT DOCUMENTS 4,347,895 A * 9/1982 Zambrow .................. 165/134.1
6,298,910 B1   10/2001 Komoda et al.
(Continued)

FOREIGN PATENT DOCUMENTS

DE    195 10 283 A1    9/1996
DE    195 48 495 A1    6/1997
(Continued)

OTHER PUBLICATIONS

Translation of WO2008078598A1, 10 pages.*
(Continued)

*Primary Examiner* — Tho V Duong
(74) *Attorney, Agent, or Firm* — Muncy, Geissler, Olds & Lowe, P.C.

(57) ABSTRACT

A heat exchanger, in particular a heat exchanger of a motor vehicle, having cooling pipes and having collecting tanks, in which heat exchanger the cooling pipes extend between the collecting tanks, in which heat exchanger the cooling pipes and the collecting tanks are spatially connected to one another, in which heat exchanger the cooling pipes are produced from a strip material with at least one cooling pipe seam, in which heat exchanger the at least one cooling pipe seam forms an inner partition of the cooling pipe, and in which heat exchanger the cooling pipes have an external solder plating on the pipe outer side and the cooling pipes have more than one coating on the pipe inner side, wherein one of the coatings on the pipe inner side is arranged only partially in the region of the at least one cooling pipe seam, as a result of which particularly high demands with regard to a multi-coating layered construction of cooling pipes of the heat exchanger can be met in a cost-effective manner.

13 Claims, 1 Drawing Sheet

(51) Int. Cl.
*B21C 37/14* (2006.01)
*B23K 1/00* (2006.01)
*F28D 1/03* (2006.01)
*F28F 21/08* (2006.01)
*F28F 19/00* (2006.01)

(56) References Cited

U.S. PATENT DOCUMENTS

| | | | |
|---|---|---|---|
| 2005/0011636 A1* | 1/2005 | Miyachi et al. | 165/133 |
| 2006/0102328 A1* | 5/2006 | Toyama et al. | 165/133 |
| 2006/0180299 A1 | 8/2006 | Igami | |
| 2007/0034366 A1 | 2/2007 | Igami et al. | |
| 2007/0138237 A1 | 6/2007 | Nishikawa et al. | |
| 2009/0159247 A1* | 6/2009 | Kendall et al. | 165/153 |
| 2010/0112370 A1* | 5/2010 | Ueda et al. | 428/576 |

FOREIGN PATENT DOCUMENTS

| | | |
|---|---|---|
| DE | 10 2006 035 210 A1 | 6/2007 |
| DE | 10 2006 058 597 A1 | 6/2007 |
| EP | 0 637 474 A1 | 2/1995 |
| EP | 1 645 830 A1 | 4/2006 |
| JP | 58049898 A * | 3/1983 |
| WO | WO 2004/099697 A1 | 11/2004 |
| WO | WO 2008/078598 A1 | 7/2008 |

OTHER PUBLICATIONS

English Abstract of JP 58049898 A, 2 pages.*
Translation of WO2008078598A1, 10 pages, Mar. 7, 2008.
English Abstract of JP 58049898 A, 2 pages, Mar. 1983.

* cited by examiner

HEAT EXCHANGER FOR A MOTOR VEHICLE, AND METHOD FOR MANUFACTURING A COOLING TUBE OF A HEAT EXCHANGER

This nonprovisional application is a continuation of International Application No. PCT/EP2009/004884, which was filed on Jul. 7, 2009, and which claims priority to German Patent Application No. DE 10 2008 031 614.8, which was filed in Germany on Jul. 7, 2008, and which are both herein incorporated by reference.

BACKGROUND OF THE INVENTION

1. Field of the Invention

The present invention relates to a heat exchanger, in particular a heat exchanger of a motor vehicle, comprising cooling tubes and comprising collecting tanks, in which the cooling tubes extend between the collecting tanks, in which the cooling tubes and the collecting tanks can be spatially connected to each other, in which the cooling tubes can be produced from a strip material having at least one cooling tube seam, in which the cooling tube seam can form an inner partition wall of the cooling tube, and in which the cooling tubes can have an outer brazing layer on the outside of the tube. The invention furthermore relates to a method for producing a cooling tube of a heat exchanger, in which a strip material is provided with at least one seam, and in which the strip material is bent and joined to form a cooling tube having at least one seam.

2. Description of the Background Art

Heat exchangers having cooling tubes and collecting tanks are known from the conventional art and are used predominantly in the automotive industry.

Cooling tubes mounted, in particular, on motor vehicle heat exchangers, also frequently referred to as seamed tubes, are often designed as longitudinally seam-welded flat tubes into which suitable longitudinal seams or beads are embossed, with the aid of which partition walls may be implemented to form separated chambers inside the flat tubes.

A first heat exchanger of this type is known, for example, from DE 698 21 385 T2 of the European patent application EP 1 030 155 B1, which both correspond to U.S. Pat. No. 6,799,630, and in which a tube is produced from a brazing sheet which is brazed on both sides. For this purpose, beads are embossed in the brazing sheet, and the brazing sheet is folded in such a way that two brazing sheet members are located directly opposite each other, thereby forming the actual flat tube. The beads form partition walls inside the flat tube, a bead of a first brazing sheet member adjoining the opposite brazing sheet member. During a suitable brazing process, in which the brazing material is melted onto the brazing sheet, the adjacent areas of the brazing sheet are joined together. Due to an unfavorable and/or insufficient brazing process, however, there is the danger that a bead is not sufficiently brazed to the adjacent brazing sheet member in the inside, which, with respect to the partition walls, enables leaks and/or overall pressure resistance problems may arise in the heat exchanger.

To counteract this problem, a heat exchanger having flat tubes as cooling tubes is furthermore known from the unexamined patent application DE 195 10 283 A1, in which the flat tubes have inwardly embossed seams which may also form partition walls within the flat tubes. To join two such opposite seals together in a particularly dependable manner, in particular in a liquid-tight or gas-tight manner, in the form of partition walls within the flat tubes, the opposite seals are joined together in their raised regions using an inductive hot pressure welding method.

In the aforementioned examples, the flat tubes also have a brazing layer on their particular outsides in order to be easily structurally brazed to other components of the heat exchanger, for example corrugated fins. Brazing the heat exchanger components may preferably be carried out using a common brazing process in a shielding gas continuous furnace, for example using fluxing agents.

SUMMARY OF THE INVENTION

It is therefore an object of the present invention to provide a heat exchanger, in particular a heat exchanger of a motor vehicle, comprising cooling tubes and comprising collecting tanks, in which the cooling tubes extend between the collecting tanks, in which the cooling tubes and the collecting tanks are spatially connected to each other, in which the cooling tubes are produced from a strip material having at least one cooling tube seam, in which the at least one cooling tube seam forms an inner partition wall of the cooling tube, and in which the cooling tubes have an outer brazing layer on the outside of the tube, and the cooling tubes have more than one coating on the inside of the tubes, one of the coatings on the inside of the tubes being only partially disposed in the area of the at least one cooling tube seam.

If the cooling tubes have more than one coating on the inside of the tubes, the cooling tubes may, on the one hand, be easily structurally provided with an anti-corrosion layer in their interiors and, on the other hand, be provided with brazing material, which is necessary for a brazed joint with regard to an inner partition wall. The manufacture of particularly high quality heat exchangers is substantially simplified thereby. According to an embodiment of the invention, one of the coatings on the inside of the tubes is only partially, i.e. exclusively, disposed in the area of the at least one cooling tube seam, which makes it possible to produce the inside of the tube in a particularly cost-effective manner, since only the necessary areas are provided with a further coating.

Ideally, this further coating on the inside of the tube is only partially applied to the strip material in the area of a later embossed cooling tube seam or in the area of a previously embossed cooling tube seam of a cooling tube for the purpose of implementation using only a small amount of material. However, it is understood that the further coating may also extend up to a point next to the embossed cooling tube seam, if this appears necessary.

The term "heat exchanger" in the present case can describe, for example, any device by means of which process heat is transferred from a first medium to a further medium so that the first medium may be cooled thereby. In particular, this includes heat exchangers of motor vehicles, for example cross flow heat exchangers used therein, in which, for example, coolants to be cooled are conducted in fluid and/or gaseous form through cooling tubes of the heat exchanger, it being possible for the cooling tubes to be also in contact with cooling fins, and in which ambient air may additionally flow around the cooling fins, so that the thermal energy from the coolants may be particularly effectively discharged into the ambient air, in particular, via the cooling fins. For example, refrigerants or other media which transport thermal energy may also be used as the coolant.

The term "collecting tank" in this context can describe, for example, any structure into which ends of the cooling tubes of the heat exchanger may project and in which coolant or a refrigerant may be introduced into the heat exchanger, discharged therefrom and/or deflected once or multiple times. The collecting tanks are preferably situated on the side of a cooling network of the heat exchanger, which cooling network is formed at least by the cooling tubes, and the cooling tanks may thus also form an edge area limiting the heat exchanger.

The "cooling tubes" in the present case can connect the collecting tanks spatially to each other. To enable the cooling tubes to have more than one chamber in the direction of their longitudinal extensions, through which chamber coolant or refrigerant may flow from one collecting tank to a further collecting tank, the cooling tubes may be suitably divided in their interiors by partition walls. The cooling tubes are often designed as flat tubes so that they may be divided particularly effectively into chambers of varying lengths by partition walls formed from cooling tube seams, referred to in short as seams.

Partition walls of this type may be easily implemented structurally by embossing one or more seams in a strip material forming a cooling tube. After suitably folding the strip material, the seams may be disposed opposite each other in their raised regions, so that the raised regions are brazed to each other and may thereby form partitions inside the cooling tubes.

Furthermore, the term "on the inside of the tube" can describe, for example, a coolant side of a cooling tube on which, for example, fluid coolants are conducted through a heat exchanger, while the term "on the outside of the tube" describes, for example, a air-side outer area around the cooling tube.

The designation "external brazing layer" can describe, for example, a coating of the strip material which includes a brazing material, for example EN AW-4343 or AlSi7.5. External brazing layers of this type are well known with regard to use on heat exchangers, so that they are not discussed in greater detail herein.

According to an embodiment, a coating facing away from the strip material can be designed to be harder than a coating facing the strip material, which makes it possible to advantageously dispose, for example, a harder brazing layer for brazing two opposite cooling tube seams on a softer sacrificial or protective brazing layer.

In this connection, according to a further embodiment, the cooling tubes can have, on the one hand, a sacrificial or protective brazing layer on the inside of the tube and, on the other hand, an inner brazing layer partially only in the area of the at least one cooling tube seam. The inner brazing layer may also be provided on all cooling tube seams of a single cooling tube, depending on the application.

Like the outer brazing layer, the inner brazing layer may also include a brazing material, for example EN AW-4343 or AlSi7.5, the inner brazing layer advantageously being provided only partially on a cooling tube seam, in particular, only along one cooling tube seam. A sacrificial brazing layer may be effectively implemented with the aid of a coating made of an EN AW-7072 or AlZn1 material. A protective brazing layer may preferably be made of pure aluminum. Brazing layers of this type make it possible to advantageously respond cost-effectively, in particular, to stricter customer requirements.

The outer brazing layer and/or the inner brazing layer can include aluminum silicon brazing materials, which makes it possible to guarantee high-quality brazed joints.

In this connection, it is advantageous if the outer brazing layer and/or the inner brazing layer have/has a silicon content of 5% to 20%, preferably of 7% to 11%.

The cooling tubes in the present case may be provided particularly cost-effectively, since the inner brazing layer is advantageously provided only in areas on or in which they are actually necessary, for example for the purpose of brazing a first cooling tube seam and a second cooling tube seam located opposite the first cooling tube seam. In the specific context of the term "inner brazing", the terms "partially" and "only" thus describe the fact that the inner brazing is not disposed on the entire inside of a cooling tube, but only in the area of a cooling tube seam.

If the inner brazing layer extends only in an area along the at least one cooling tube seam, a brazed joint may be implemented on a cooling tube seam or on multiple cooling tube seams using a particularly small amount of material with respect to the inner brazing layer.

In this context, in particular, an object of the invention is also achieved by a method for manufacturing a cooling tube of a heat exchanger, in which a strip material is provided with at least one cooling tube seam, and in which the strip material is bent and joined to form a cooling tube having at least one cooling tube seam, the method being characterized in that an additional brazing layer is applied to the strip material exclusively in the area of the at least one cooling tube seam in such a way that two opposite strip material areas may be brazed to each other with the aid of the additional brazing layer on a cooling inside of the tube of the cooling tube.

The at least one cooling tube seam in the present case can be embossed onto or into the strip material. In order to permanently join a bent strip material to form a cooling tube, the cooling tube may be inductively hot-pressure welded on a longitudinal butt joint.

It is understood that the additional brazing layer or the present inner brazing layer may be applied to the strip material using different techniques. For example, the additional brazing layer is applied to the strip material using a thermal spraying method, using a cold gas spraying method or using an arc spraying method. Since all methods are well known from the prior art, they will not be explicitly explained in further detail herein. However, it should be mentioned that a coil coating method is also suitable for applying the additional brazing layer.

The additional brazing layer or the present inner brazing layer may be particularly easily implemented on a cooling tube seam using process engineering means if the additional brazing layer is applied in an area of the strip material where the cooling tube seam will subsequently be formed or embossed on the strip material. A fluxing agent may also be introduced into the additional brazing layer in order to achieve a better cooling tube seam brazing.

If the sacrificial or protective brazing layer on the inside of the tube is disposed between the strip material and the inner brazing layer, the sacrificial or protective brazing layer may coat the entire inside of the tube, while the inner brazing layer is disposed only in the area of the at least one cooling tube seam.

According to an embodiment, the cooling tubes can have a layer structure from the outside to the inside, including the outer brazing layer, the strip material, the sacrificial or protective brazing layer and the inner brazing layer, exclusively in the area of the at least one cooling tube seam. As a result, the cooling tubes have a four-layer structure only in specific areas in which this four-layer structure alone is necessary, making it possible to manufacture the present cooling tubes much more easily and cost-effectively.

A partial four-layer structure of this type may be implemented particularly easily if the strip material is provided in the form of a three-layer aluminum strip material. The three-layer aluminum strip material is made of, for example, a core material such as EN AW-3003 mod., an air-side brazing layer such as EN AW-4343, and a coolant-side sacrificial brazing layer such as EN AW-7072. An additional brazing layer may then be partially applied to the coolant-side sacrificial brazing layer.

A strip material in the present case can be used which has a material thickness of more than 0.03 mm, preferably more than 0.05 mm. This enables the cooling tubes to be designed with a sufficient degree of pressure stability.

If the strip material has a material thickness of less than 2 mm, preferably less than 1 mm, the cooling tubes may be provided with a relatively light-weight design.

The strip material may be produced from different materials. A high corrosion resistance and/or a favorable weight with regard to the heat exchanger may be achieved if the strip material is produced from one of the materials of aluminum, stainless steel or a nickel based alloy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
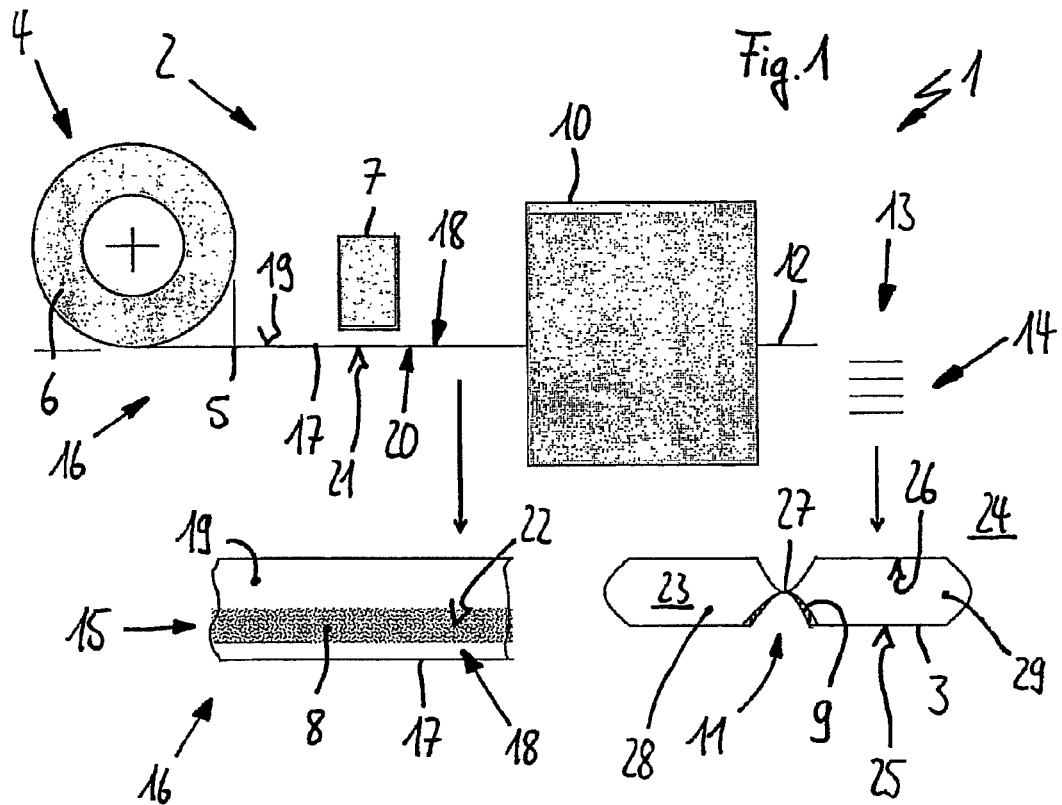
FIG. 1 shows a schematic representation of a method diagram of the partial application of a brazing strip to a tube strip for the purpose of brazing a seamed tube.

Method diagram 1 shown in FIG. 1 illustrates a schematic representation of a production line 2 for flat cooling tubes 3 of a not shown heat exchanger of a motor vehicle. Production line 2 largely comprises a coil device 4 for uncoiling a strip material 5 from a coil 6, an application device 7 for partially applying a brazing strip 8 in the form of a later inner brazing layer 9, a tube processing machine 10 which is used to emboss at least one cooling tube seam 11 into strip material 5 and with the aid of which strip material 5 may be bent and welded together to form a flat tubing 12, and a cutting device 13 which is used to cut flat tubing 12 into a plurality 14 of flat cooling tubes 3. Brazing strip 8 is advantageously applied exclusively in a partial area 15 of strip material 5 in which cooling tube seam 11 is embossed. Strip material 5 is made of a three-layer aluminum strip material 15, including a core material 17, a first coating 18 on first side 19 of core material 17, and a second coating 20 on a second side 21 of the core material. Brazing strip 8 forms a further coating 22, which together with first coating 18 will be later disposed on the inside of tube 23 with respect to finished flat cooling tube 3. Second coating 20 is located on the outside of tube 24 with respect to flat cooling tube 3 and forms an outer brazing layer 25 on flat cooling tube 3. First coating 18 provides a protective brazing layer 26 for flat cooling tube 3 on the inside of tube 23.

On flat cooling tube 3 illustrated according to this exemplary embodiment, two opposite cooling tube seams 11 form an inner partition wall 27 of flat cooling tube 3, only one of cooling tube seams 11 being provided with an inner brazing layer 9 in order to save material. Inner partition wall 27 divides flat cooling tube 3 into a first longitudinal chamber 28 and into a second longitudinal chamber 29.

Figure 2:
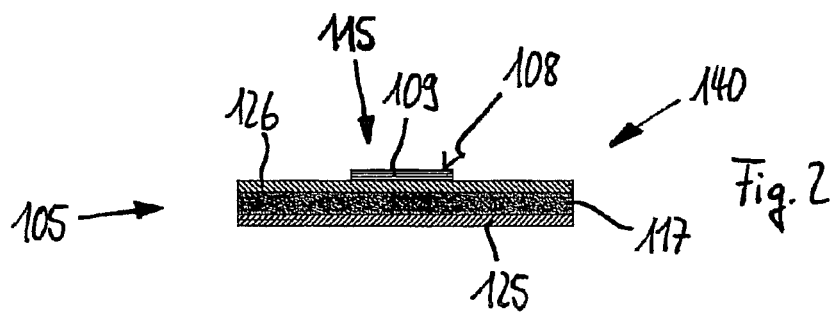
FIG. 2 shows a schematic representation of a cross section of a three-layer aluminum strip, to which an additional brazing strip has been partially applied.
Figure 3:
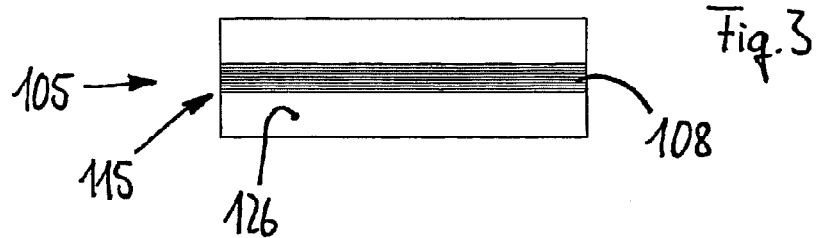
FIG. 3 shows a schematic representation of a top view of the three-layer aluminum strip.

Advantageously, strip material 105 illustrated in FIGS. 2 and 3 only partially has a four-layer layer structure 140, namely an outer brazing layer 125, a core layer 117, a protective brazing layer 126 and an inner brazing layer 109, which is applied to protective brazing layer 126 of strip material 105 in the form of a narrow brazing strip 108. Narrow brazing strip 108 may be applied, for example, using a cold-gas spraying method. This enables a cooling tube 3 (see FIG. 1) to be manufactured easily and cost-effectively using process engineering means, despite a high quality layer structure 140.

Brazing strip 108 is applied only in an area 115 of strip material 105, in which a cooling tube seam 11 (see FIG. 1) will be embossed later on, making it possible to advantageously provide four-layer layer structure 140 only partially in areas 115 in which the structure is needed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger for a motor vehicle, the heat exchanger comprising:
cooling tubes; and
collecting tanks configured such that the cooling tubes extend between the collecting tanks,
wherein the cooling tubes and the collecting tanks are spatially connected to each other,
wherein the cooling tubes are formed of a strip material having at least one cooling tube seam, the cooling tube seam forming an inner partition wall of the cooling tube,
wherein the cooling tubes have an outer brazing layer on an outside of the tube,
wherein the cooling tubes have more than one coating on the inside of the tube, one of the coatings on the inside of the tube being an inner brazing layer that is only partially disposed in an area of the at least one cooling tube seam,
wherein the inner brazing layer includes aluminum/silicon brazing materials,
wherein another one of the coatings on the inside of the tube is a sacrificial or protective brazing layer that is made of pure aluminum, and
wherein the strip material is aluminum, stainless steel, or a nickel-based alloy.

2. The heat exchanger according to claim 1, wherein a first coating on the inside of the tube is harder than a second coating on the inside of the tube.

3. The heat exchanger according to claim 1, wherein the inner brazing layer extends along the at least one cooling tube seam only in one area.

4. The heat exchanger according to claim 1, wherein the sacrificial or protective brazing layer on the inside of the tube is disposed between the strip material and the inner brazing layer.

5. The heat exchanger according to claim 1, wherein the cooling tubes have a layer structure from the outside to the inside, including an outer brazing layer, the strip material, the sacrificial or protective brazing layer, and the inner brazing layer in the area of the at least one cooling tube seam.

6. The heat exchanger according to claim 1, wherein the strip material is provided in the form of a three-layer aluminum strip material.

7. The heat exchanger according to claim 1, wherein the strip material has a material thickness of more than 0.03 mm or more than 0.05 mm.

8. The heat exchanger according to claim 1, wherein the strip material has a material thickness of less than 2 mm or less than 1 mm.

9. The heat exchanger according to claim 1, wherein the outer brazing layer includes aluminum/silicon brazing materials.

10. The heat exchanger according to claim 1, wherein the outer brazing layer and/or the inner brazing layer have a silicon content of 5% to 20% or 7% to 11%.

11. A heat exchanger for a motor vehicle, the heat exchanger comprising:
cooling tubes,
wherein the cooling tubes are formed of a strip material having at least one cooling tube seam, the cooling tube seam forming an inner partition wall of the cooling tube,
wherein the cooling tubes have an outer brazing layer on an outside of the strip material,
wherein the cooling tubes have more than one coating on the inside of the strip material, one of the coatings on the inside of the strip material being a sacrificial or protective brazing layer and another of the coatings on the inside of the strip material being an inner brazing layer that is only disposed in an area of the at least one cooling tube seam,
wherein the inner brazing layer includes aluminum/silicon brazing materials and the sacrificial or protective brazing layer is made of pure aluminum, and
wherein the strip material is aluminum, stainless steel, or a nickel-based alloy.

12. The heat exchanger according to claim 11, wherein the sacrificial or protective brazing layer is disposed between the strip material and the inner brazing layer.

13. A heat exchanger for a motor vehicle, the heat exchanger comprising:
cooling tubes,
wherein the cooling tubes are formed of a strip material having at least one cooling tube seam, the cooling tube seam forming an inner partition wall of the cooling tube,
wherein the cooling tubes have an outer brazing layer on an outside of the strip material,
wherein the cooling tubes have more than one coating on the inside of the strip material, one of the coatings on the inside of the strip material being a sacrificial or protective brazing layer and another of the coatings on the inside of the strip material being an inner brazing layer that is only disposed in an area of the at least one cooling tube seam,
wherein the inner brazing layer includes aluminum/silicon brazing materials and the sacrificial or protective brazing layer is made of pure aluminum, and
wherein the strip material is a nickel-based alloy.

* * * * *